(12) United States Patent
Krummrich

(10) Patent No.: US 6,870,665 B2
(45) Date of Patent: Mar. 22, 2005

(54) PUMPING SOURCE WITH A NUMBER OF PUMPING LASERS FOR THE RAMAN AMPLIFICATION OF A WDM SIGNAL WITH MINIMIZED FOUR-WAVE MIXING

(75) Inventor: Peter Krummrich, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 46 days.

(21) Appl. No.: 10/284,614

(22) Filed: Oct. 31, 2002

(65) Prior Publication Data

US 2003/0117697 A1 Jun. 26, 2003

(30) Foreign Application Priority Data

Oct. 31, 2001 (DE) .......................................... 101 53 744

(51) Int. Cl.[7] .................................................. H01S 3/00
(52) U.S. Cl. ....................................................... 359/334
(58) Field of Search .............................. 359/334, 337.1, 359/337.11, 341.3, 341.33; 372/3, 6, 33, 70

(56) References Cited

U.S. PATENT DOCUMENTS

| | | | |
|---|---|---|---|
| 6,191,877 B1 | 2/2001 | Chraplyvy et al. | 359/124 |
| 6,323,993 B1 * | 11/2001 | Hansen et al. | 359/337 |
| 6,330,104 B1 * | 12/2001 | Kim et al. | 359/332 |
| 2003/0076577 A1 * | 4/2003 | Dominic et al. | 359/334 |
| 2003/0133179 A1 * | 7/2003 | Islam et al. | 359/334 |

FOREIGN PATENT DOCUMENTS

| | | | |
|---|---|---|---|
| DE | 100 49 394 | 5/2001 | ............. H01S/3/00 |
| EP | 0 717 524 | 6/1996 | ............. H01S/3/00 |
| WO | WO 01/22627 | 3/2001 | ............. H01S/3/00 |

OTHER PUBLICATIONS

IEEE Photonic's Technology Letters, vol. 12, Nio. 11, Nov. 2000—"Accumulation of Gain Tilt in WDM Amplified Systems Due to Raman Crosstalk" Mazurczky et. al., pp. 1573–1575.

"Impact of nonlinear pump interactions on broadband distributed Raman amplification", Neuhauser et al.

IEEE Journal on Selected Topics in Quantum Electronics, vol. 7, No. 1, Jan./Feb. 2001 "Ultrabroad–Band Raman Amplifiers Pumped and Gain–Equalized by Wavelength–Division–Multiplexed High–Power Laser Diodes" Namiki et al., pp. 3–16.

* cited by examiner

*Primary Examiner*—Mark Hellner
*Assistant Examiner*—Deandra M. Hughes
(74) *Attorney, Agent, or Firm*—Bell, Boyd & Lloyd LLC

(57) ABSTRACT

A pumping source is provided for the Raman amplification of an optical wavelength division multiplex signal, wherein the pumping source has a number of pumping lasers with, in each case, different pumping wavelengths. Modules for the angle and/or amplitude modulation of pumping signals of the pumping lasers are connected to the pumping lasers, such that by appropriate adaptation of the modulation of the pumping signals mixing products from four-wave mixing between the pumping signals are suppressed.

16 Claims, 2 Drawing Sheets

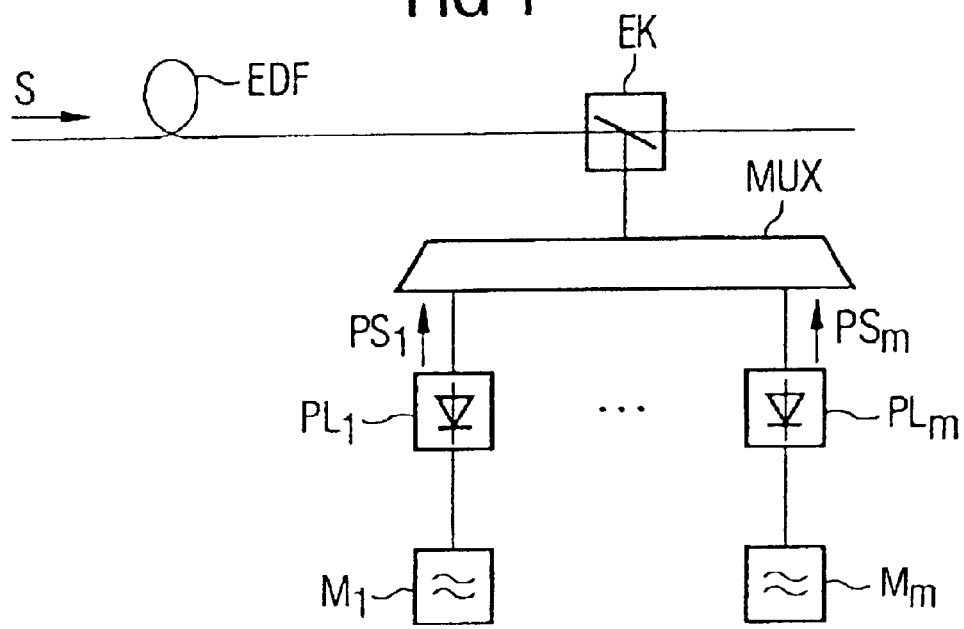
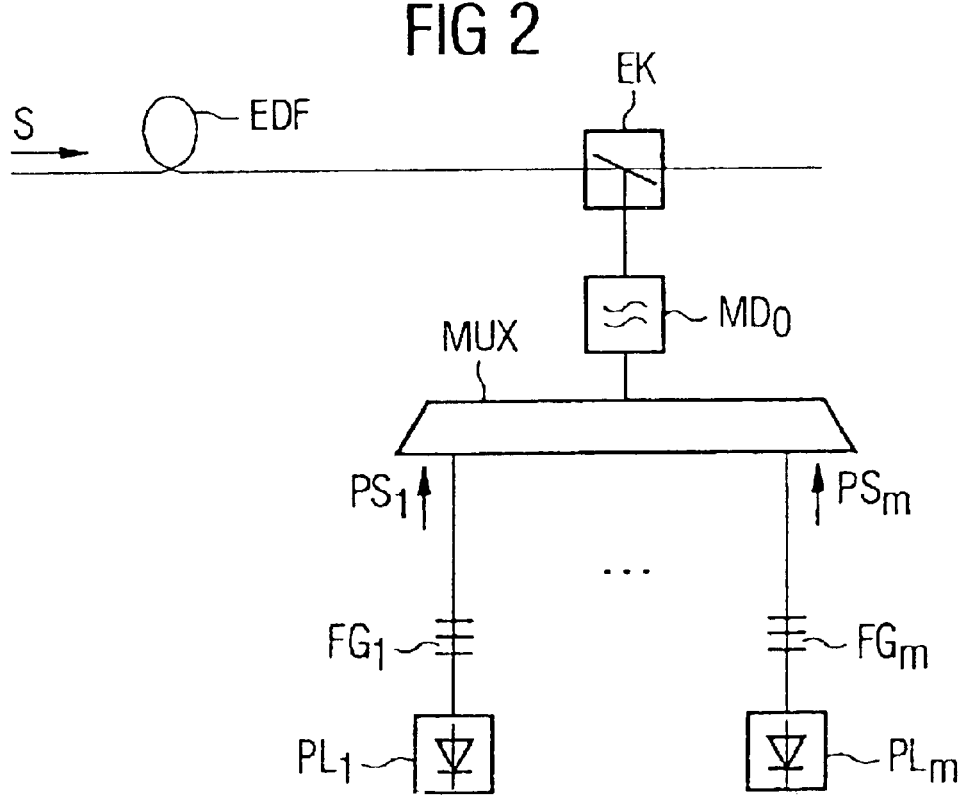

PUMPING SOURCE WITH A NUMBER OF PUMPING LASERS FOR THE RAMAN AMPLIFICATION OF A WDM SIGNAL WITH MINIMIZED FOUR-WAVE MIXING

BACKGROUND OF THE INVENTION

For the transmission of an optical WDM signal along long fiber-optic links, optical amplifier modules are required after respective transmission sections. An effective method of additionally amplifying a signal is based on stimulated Raman scattering, in which a pumping signal is launched into the transmission fiber. The pumping signal may, in this case, be generated via a plurality of pumping sources; typically, laser diodes.

The set of wavelengths of the pumping sources is chosen such that all the channels of the WDM signal, usually in the C band and L band (of about 1525 nm to about 1610 nm), are amplified as equally as possible, taking into account the Raman gain spectrum (see "Fiber Optic Communication Systems", G. P. Agrawal, 2nd edition, p. 381, FIG. 8.11). A channel with a frequency shift of 13.2 THz in relation to a pumping frequency is amplified to the maximum. If there is a smaller or larger frequency difference between a channel and a pumping signal, the channel is amplified less. By using a relatively large number of different pumping wavelengths, all the channels of the WDM transmission signals are amplified more homogeneously. As a result, a flat Raman gain spectrum of all the channel levels is achieved. Such a Raman amplifier is described, for example, in the older patent application with the file number P 10048460.3.

Mach-Zender interferometers, which allow operation for launched powers of up to 2 W, for example, are often used for multiplexing the various pumping wavelengths. This requires a pumping wavelength array with pumping wavelengths that are equidistant from one another. A more detailed description is given in the publication "Namiki et al., Proc. OAA 2000, Quebec, OMB 2, 7–9". It is possible to use interference filters when multiplexing a small number of pumping wavelengths. In this case, non-equidistant spacings of the pumping wavelengths also are allowable. The power launched in such multiplexers is, however, lower than in the case of Mach-Zender interferometers. In the publication "Kidorf et al., IEEE Phot. Technol. Lett., 11 (1999), 530–532", there is a description of non-equidistant distribution of the pumping wavelengths, in the case of which a greater concentration of the smaller pumping wavelengths is provided in comparison with larger pumping wavelengths. A corresponding power transfer from small to larger pumping wavelengths is compensated as a result of Raman interaction along the fiber.

Four-wave mixing FWM occurs between the pumping wavelengths in certain types of fiber, particularly in the case of high powers and/or low dispersion in the region of the pumping wavelengths, when use is made of equidistant pumping wavelengths for signal transmission in the C band and L band (i.e., pumping wavelengths between approximately 1420 nm and 1510 nm and signal wavelengths between about 1525 nm and 1610 nm). A detailed description of four-wave mixing is given in "Agrawal, Non-linear Fiber Optics, 1995, p. 404. This arises in particular whenever spectral components of the pumping signals lie near the zero crossing of the dispersion, such as at 1510 nm, of the amplifier fiber. As a result, new frequency components, or what are termed mixing products, are generated in the case of sums or differences of pumping frequencies that are superposed in or outside the spectrum of the pumping source. Consequently, the mixing products likewise can be superposed directly on the WDM signal spectrum in the case of codirectional pumping into the amplifier fiber and cause interference if the higher pumping wavelengths lie near the smaller signal wavelengths. The signal quality, such as the signal-to-noise ratios OSNR of specific channels of the WDM signal, is worsened as a result. Even in the case of contradirectional pumping into the amplifier fiber, (i.e., if pumping channels and the signal channels to be amplified in the amplifier fiber propagate in opposite directions), the mixing products can cause interferences. This is because the mixing products produced initially in the direction counter to the signal channels are reflected by Rayleigh scattering. The reflected components then propagate in the same direction as the signal channels. In this way, spectral components which are superposed on signal channels can be produced. Since the mixing products are likewise themselves amplified by stimulated Raman scattering, their amplitude can increase in such a way that the transmission is greatly impaired.

Previous methods of reducing four-wave mixing, particularly between pumping signals, use a non-equidistant arrangement of the pumping wavelengths, in order that the reduced mixing products lie outside the ranges of the pumping or signal wavelengths. This technique is explained in "Comparisons of Four-Wave Mixing Suppression Techniques in a Multichannel Coherent WDM Systems", Bohyeon Hwang, Information and Communication Division, Samsung SDS Co. Ltd., APCC 1997, pages 648–652.

The use of an amplifier fiber with high dispersion also makes suppression of the mixing products from the pumping signals possible. However, a high dispersion is not always desired for the signal channels.

By introducing differential time delays between the channels, with division of the channels and with the use of delay lines of lengths differing from channel to channel, mixing products are also suppressed. However, this only can be achieved by expanding the WDM transmission system in a complex procedure.

German Patent Application DE 10111491.5 also discloses a pumping source with, in each case, a number of pumping lasers for the Raman amplification of a WDM signal with minimized four-wave mixing. In this case, the pumping wavelengths are chosen such that mixing products in the spectrum of a transmitted WDM signal are minimized or removed. This produces defined transmission bands of the WDM signal in the C band and L band with mixing products in between, which consequently do not impair the transmission in the transmission bands.

WO 01/22627 A1 likewise discloses an arrangement for and a method of reducing four-wave mixing in the transmission of a non-return-to-zero (NRZ) WDM signal. The phase of the channels is periodically modulated from channel to channel in such a way that mixing products due to four-wave mixing between the signal channels are suppressed at the transmitter of the transmission system. However, nothing is suggested about mixing products which impair the transmission properties from pumping sources up to launching into the transmission fiber.

It is, therefore, an object of the present invention to eliminate or at least greatly minimize the influence of the mixing products produced from a broadband pumping source due to four-wave mixing.

SUMMARY OF THE INVENTION

Accordingly, the pumping source of the present invention has a number of pumping lasers which generate pumping signals with different pumping wavelengths. For the Raman amplification of a wavelength division multiplex (WDM) signal transmitted over a fiber, these pumping signals are launched into the fiber via a launching device. According to the present invention, modules for the angle and/or amplitude modulation of the pumping signals are connected to some or all of the pumping lasers.

The amplitudes of the injection currents of the pumping lasers are modulated by the modules in such a way that mixing products from wave mixing processes between the pumping signals or due to four-wave mixing are advantageously suppressed. No longer existing, or at least reduced, mixing products from the pumping source therefore will not impair the transmission of the WDM signal, or much less so.

Pumping signals that are neighboring in frequency terms advantageously have in the case of angle modulation a different angle position with the same modulation frequency to reduce the mixing products.

For the suppression according to the present invention of the mixing products between pumping signals, a corresponding modulation frequency or a maximum modulation amplitude is chosen such that, with contradirectional pumping into the fiber, the modulation of the pumping signals does not lead to interfering modulation of the channels of the WDM signal.

Some variants of the pumping source according to the present invention also can be achieved by different arrangement of the modules for angle and/or amplitude modulation. The angle or amplitude modulation can be achieved either by appropriate setting of the injection currents of the pumping lasers or by optical modulators.

Additional features and advantages of the present invention are described in, and will be apparent from, the following Detailed Description of the Invention and the Figures.

BRIEF DESCRIPTION OF THE FIGURES

FIG. 1 shows the pumping source according to the present invention with angle modulation of the pumping signals.

FIG. 2 shows the pumping source according to the present invention with amplitude modulation of the pumping signals.

DETAILED DESCRIPTION OF THE INVENTION

Figure 3:
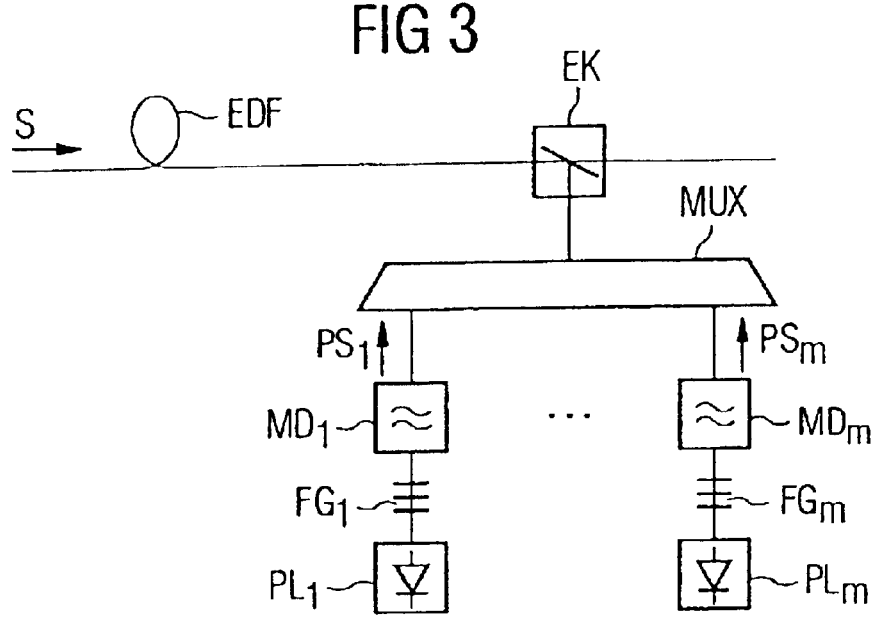
FIG. 3 shows a second way of achieving the pumping source according to the present invention with amplitude modulation of the pumping signals.

FIG. 1 shows a pumping source according to the present invention, which has a number of pumping lasers $PL_1, \ldots, PL_m$, operated with different pumping wavelengths $\lambda_1, \ldots, \lambda_m$ (m>0), for Raman amplification of a wavelength division multiplex (WDM) signal S transmitted over a fiber EDF. A multiplexer MUX combines all the pumping signals $PS_1, \ldots, PS_m$ emanating from respective pumping lasers $PL_1, \ldots, PL_m$. The combined pumping signals are launched contradirectionally into the fiber EDF via a launching device EK. Different variants of launching devices, including for codirectional pumping, can be achieved, but are not explained any further in the case of the present application.

Connected to all or at least some of the pumping lasers $PL_1, \ldots, PL_m$ are modules $M_1, \ldots, M_m$ for the angle or frequency modulation of the corresponding pumping signals $PS_1, \ldots, PS_m$. This modulation is referred to below as angle modulation.

Amplitude modulation of the pumping signals $PS_1, \ldots, PS_m$ likewise is possible. In that case, pumping signals that are neighboring in frequency terms are modulated with different amplitudes. For example, a periodic modulation of the amplitudes between two neighboring pumping signals $\ldots, PS_1, PS_{1+1}, \ldots$ with 0 and 1 (full modulation) may be used. Since wave mixing usually takes place between neighboring pumping channels, at least the mixing products of two successive pumping signals are suppressed.

The modules $M_1, \ldots, M_m$ used have a low insertion attenuation to avoid pumping losses.

In the case of this exemplary embodiment, semiconductor laser diodes are used as pumping lasers $PL_1, \ldots, PL_m$. As a result, the angle modulation of the pumping signals $PS_1, \ldots PS_m$ is made possible in an advantageous way by a low amplitude modulation of injection currents $I_1, \ldots, I_m$ of the pumping lasers $PL_1, \ldots, PL_m$.

With regard to the amplitude of the four-wave mixing, it is the case that it is all the lower the higher the modulation frequency. Therefore, a modulation frequency that is correspondingly as near the maximum as possible is chosen, up to which, with contradirectional launching of the pumping signals, frequency component signals of the pumping signals $PS_1, \ldots, PS_m$ still transfer optimally to the channels of the WDM signal; i.e., without disturbing modulation of the channels of the WDM signal. On the other hand, the modulation frequency remains smaller than the relaxation frequencies of the pumping lasers $PL_1, \ldots, PL_m$.

Likewise, a large modulation amplitude is chosen in order that mixing products from four-wave mixing FWM are distributed over a wide spectral range. As a result, the power density per wavelength range falls and, consequently, so too does the interference power within the bandwidth of the WDM signal S.

Mixing products are produced only when there is a common propagation of signals along a fiber. Therefore, the pumping signals $PS_1, \ldots, PS_m$ are angle- or amplitude-modulated right away at the output of the pumping lasers $PL_1, \ldots, PL_m$. As a result, mixing products of the pumping signals $PS_1, \ldots, PS_m$ are suppressed before they are launched into the fiber EDF and also during the propagation in the fiber EDF.

Since four-wave mixing is an angle-dependent effect between channels, the amplitude of the mixing products can be lowered by advantageous choice of a angle relationship between the channels. An angle position $\phi_1, \ldots, \phi_m$ of the pumping signals $PS_1, \ldots, PS_m$ differing or alternating from channel to channel (for example, periodically on the basis of schemes S1=(+π, −π, +π, −π, ...) or S2=(+π, 0, −π, 0 ...)), can be set easily with the same modulation frequency for an angle modulation. For the scheme S1, the angle position $\phi_1, \ldots, \phi_m$ jumps from pumping laser to pumping laser by 180°; for the second scheme S2, an unmodulated pumping signal lies between two modulated pumping signals in angle opposition. The angle position of the pumping signals $PS_1, \ldots, PS_m$ can be controlled by the modules $M_1, \ldots, M_m$, but also can be achieved by different lengths of fibers after the pumping lasers $PL_1, \ldots, PL_m$ before the launch into the fiber EDF.

The pumping source according to the present invention was embodied in this case by 7 pumping lasers $PL_1, \ldots, PL_7$, the injection currents $I_1, \ldots, I_7$ of which have a modulation frequency of 10 MHz, a modulation index of about 10% and an angle difference from channel to channel of 180°.

In FIG. 2, a pumping source according to the present invention for the amplitude modulation of the pumping signals $PS_1, \ldots, PS_m$ is represented. In comparison with the pumping source in FIG. 1, instead of the modules $M_1, \ldots, M_m$, an optical modulator $MD_0$ is arranged between the multiplexer MUX and the launching device EK and modulates the amplitude of each of the pumping signals $PS_1, \ldots, PS_m$ in such a way that mixing products are suppressed by providing that pumping lasers of neighboring wavelengths are, as far as possible, never activated at the same time. Instead of the optical modulator $MD_0$, it is possible, with use of the modules $M_1, \ldots, M_m$, for the amplitude modulation of the pumping signals $PS_1, \ldots, PS_m$ similarly to be achieved as in FIG. 1 via the modulation of the injection currents of modules $M_1, \ldots, M_m$ used. In addition, fiber gratings $FG_1, \ldots, FG_m$ are arranged at the output of the pumping lasers $PL_1, \ldots, PL_m$ to stabilize the pumping wavelengths $\lambda_1, \ldots, \lambda_m$. In the case of angle modulation, as in FIG. 1, the fiber gratings $FG_1, \ldots, FG_m$ likewise can be connected to the pumping lasers $PL_1, \ldots, PL_m$.

FIG. 3 shows a variant of the pumping source represented in FIG. 2 in the case of amplitude modulation of the pumping signals $PS_1, \ldots, PS_m$. The optical modulator $MD_0$ is replaced by a number of optical single-channel modulators $MD_1, \ldots, MD_m$ and the single-channel modulators $MD_1, \ldots, MD_m$ are arranged between the multiplexer MUX and the pumping lasers $PL_1, \ldots, PL_m$. The fiber gratings $FG_1, \ldots, FG_m$ likewise are arranged downstream of the outputs of the pumping lasers $PL_1, \ldots, PL_m$.

Figure 4:
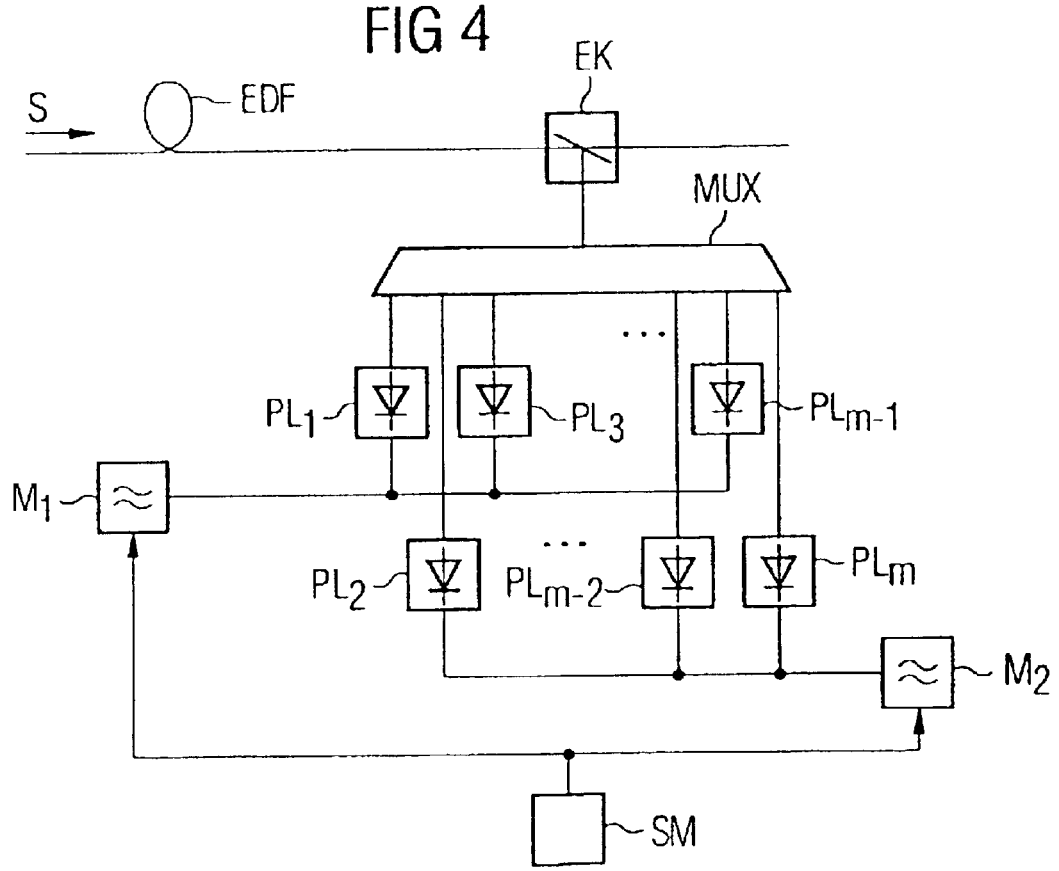
FIG. 4 shows a simplified pumping source with periodic angle or amplitude modulation of the pumping signals.

FIG. 4 shows a simplified embodiment of the pumping source according to the present invention with arranged modules $M_1, \ldots, M_m$ or modulators $MD_1, \ldots, MD_m$ in the case of optical angle or amplitude modulation of the pumping signals instead of amplitude modulation of the injection currents of the pumping lasers. In the case of a periodic angle and/or amplitude modulation of the pumping signals $PS_1, \ldots, PS_m$, the number of modules $M_1, \ldots, M_m$ or modulators $MD_1, \ldots, MD_m$ used is reduced to the number of successive modulated pumping signals over a period. For example, for a periodic, angle position based on the scheme $S1=(+\pi, -\pi, +\pi, -\pi, \ldots)$, a first module $M_1$ is arranged upstream of the pumping lasers $PL_1, PL_3, \ldots, PL_{m-1}$ and a second module $M_2$ is arranged upstream of the pumping lasers $PL_2, PL_4, \ldots, PL_m$. A control module SM is connected to the modules $M_1, M_2$, in order that two successive pumping signals have the angle position $+\pi$ or $-\pi$ simultaneously. As an advantageous result, only two modules $M_1, M_2$ are used.

Although the present invention has been described with reference to specific embodiments, those of skill in the art will recognize that changes may be made thereto without departing from the spirit and scope of the present invention as set forth in the hereafter appended claims.

What is claimed is:

1. A pumping source for Raman amplification of a wavelength division multiplex signal transmitted over a fiber, comprising:

a plurality of pumping lasers for generating pumping signals with respectively different pumping wavelengths;

a launching device for launching the pumping signals into the fiber; and a plurality of modules connected to at least some of the pumping lasers for at least one of angle modulation and amplitude modulation of the respective pumping signals, wherein, for angle modulation, pumping signals in neighboring frequencies have a same modulation frequency and a different angle position such that mixing products of the pumping signals are suppressed before being launched into the fiber and during propagation in the fiber.

2. A pumping source as claimed in claim 1, wherein injection currents of the pumping lasers are amplitude-modulated by the plurality of modules for the at least one of angle modulation and amplitude-modulation of the pumping signals.

3. A pumping source for Raman amplification of a wavelength division multiplex signal transmitted over a fiber, comprising:

a plurality of pumping lasers for generating pumping signals with respectively different pumping wavelengths;

a launching device for launching the pumping signals into the fiber; and a plurality of modules connected to at least some of the pumping lasers for at least one of angle modulation and amplitude modulation of the respective pumping signals, wherein, for amplitude modulation, pumping signals in neighboring frequencies have different amplitudes such that mixing products of the pumping signals are suppressed before being launched into the fiber and during propagation in the fiber.

4. A pumping source as claimed in claim 1, wherein, for contradirectional pumping signals, a modulation frequency of the pumping signals is lower than a cut-off frequency which is smaller than relaxation frequencies of the pumping lasers.

5. A pumping source as claimed in claim 1, wherein the pumping signals are linearly angle-modulated.

6. A pumping source as claimed in claim 1, further comprising a control module for jointly controlling one of the plurality of modules.

7. A pumping source as claimed in claim 1, further comprising:

a plurality of fiber gratings respectively arranged downstream of the pumping laser to respectively stabilize the pumping wavelengths;

a multiplexer for combining the pumping signals; and a modulator arranged between the multiplexer and launching device.

8. A pumping source as claimed in claim 1, further comprising:

a plurality of fiber gratings respectively arranged downstream of the pumping laser to respectively stabilize the pumping wavelengths;

a multiplexer for combining the pumping signals; and a plurality of modulators respectively arranged between the fiber gratings and the multiplexer.

9. A pumping source as claimed in claim 8, further comprising a control module for jointly controlling one of the plurality of modules ($M_1, \ldots, M_n$) and the plurality of modulators ($MD_1, \ldots, MD_m$) for a plurality of the pumping lasers, where $m \geq n$.

10. A pumping source as claimed in claim 3, wherein injection currents of the pumping lasers are amplitude-modulated by the plurality of modules for the at least one of angle modulation and amplitude-modulation of the pumping signals.

11. A pumping source as claimed in claim 3, wherein, for contradirectional pumping signals, a modulation frequency of the pumping signals is lower than a cut-off frequency which is smaller than relaxation frequencies of the pumping lasers.

12. A pumping source as claimed in claim 3, wherein the pumping signals are linearly angle-modulated.

13. A pumping source as claimed in claim 3, further comprising a control module for jointly controlling one of the plurality of modules.

14. A pumping source as claimed in claim 3, further comprising:

a plurality of fiber gratings respectively arranged downstream of the pumping laser to respectively stabilize the pumping wavelengths;

a multiplexer for combining the pumping signals; and a modulator arranged between the multiplexer and launching device.

15. A pumping source as claimed in claim 3, further comprising:
- a plurality of fiber gratings respectively arranged downstream of the pumping laser to respectively stabilize the pumping wavelengths;
- a multiplexer for combining the pumping signals; and
- a plurality of modulators respectively arranged between the fiber gratings and the multiplexer.

16. A pumping source as claimed in claim 15, further comprising a control module for jointly controlling one of the plurality of modules ($M_1, \ldots, M_n$) and the plurality of modulators ($MD_1, \ldots, MD_m$) for a plurality of the pumping lasers, where $m \geq n$.

* * * * *